United States Patent Office 3,424,258
Patented Jan. 28, 1969

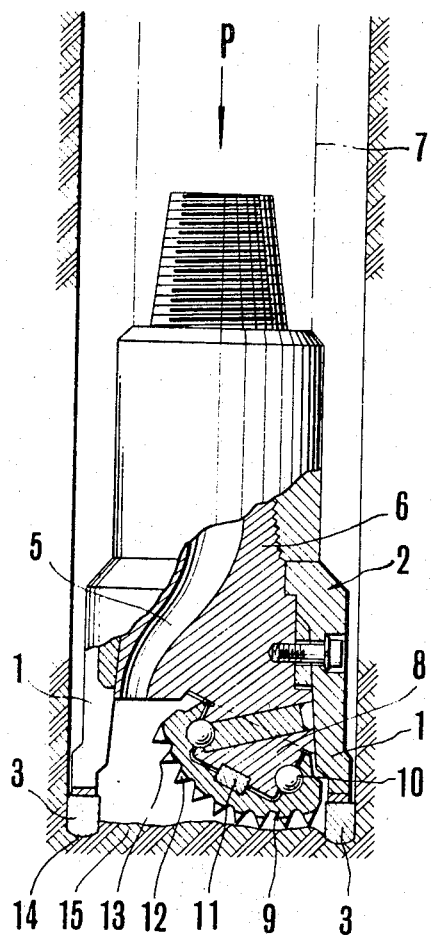
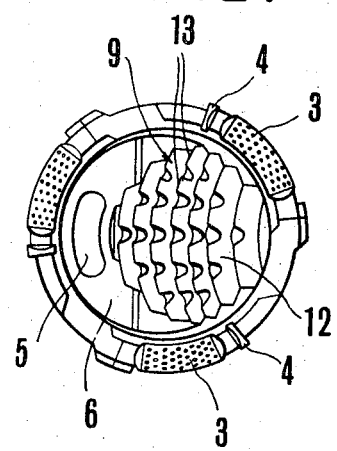
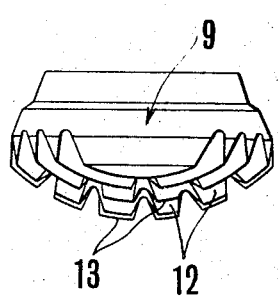

3,424,258
ROTARY BIT FOR USE IN ROTARY DRILLING
Yoshihiro Nakayama, Tokyo, Japan, assignor to Japan Petroleum Development Corporation, Tokyo, Japan, a corporation of Japan
Filed Nov. 13, 1967, Ser. No. 682,038
Claims priority, application Japan, Nov. 16, 1966, 41/74,989
U.S. Cl. 175—333               1 Claim
Int. Cl. E21b 9/18; E21c 13/02

ABSTRACT OF THE DISCLOSURE

A rotary bit for use in rotary drilling, comprising a plurality of spaced cutting edges formed in a plurality of parallel rows on a semi-spherical convex rotary member rotatably mounted on an inclined supporting shaft provided within the body of said rotary drill equipped with scraping members on the lower end of the leg of said body for producing a raised core of rock for being cut by said cutting edges, said rows being disposed perpendicular to the same diameter of said convex rotary member, each cutting edge of one row being disposed substantially parallel to the adjacent edges of the adjacent rows.

BACKGROUND OF THE INVENTION

Field of the invention

The present invention is concerned with an improvement of rotary bits for use in rotary rock drills which are used in boring hard formation or hard rock base in oil well drilling, in mines or in civil engineering.

Description of the prior art

Rotary bits of the type wherein a rotary cutter is rotatably mounted on an inclined supporting shaft attached to the body of the drill which is provided with scraping members at the foot thereof for producing a raised core of rock for being cut by said cutter, are known. However, the cutting edges of the conventional rotary drills were disposed radially relative to the apex of a conical shaped rotary member carrying the cutting edges. Therefore, in case boring was carried out by continuously rotating said drill, it was necessary, during the action of the cutting edges of the rotary member to contact again, under pressure, with one of the angled ridges of the rock already formed in the form of the teeth of a toothed wheel by the cutting edges 12' of the rotary member as shown in FIG. 6 and to remove said ridge of rock by cutting the same, the cutting edge 12' moving downwardly in the direction of the arrow A from the point 24 of the contact of said cutting edge with the sloped face of the angled ridge of the rock. However, with the bits of the conventional art, the cutting edge tended, during the aforesaid operation, to slip down in the direction of the arrow B along the sloped face of the ridge of rock because a load P was applied onto the cutting edge while the latter was in the state of being in contact with the sloped face of the ridge of rock. Accordingly, there was a wasteful loss of energy, and in addition, the cutting edge was brought into sliding contact with the sloped face of the already formed ridge of rock, or in other words, the already formed ridge was placed substantially beneath the recessed portion or groove between the cutting edges of the rotary member. As a result, there was a marked reduction in the force of the drill bit to destroy said ridge of rock.

Other than the aforesaid structure, a rotary drill bit having a conical shape rotary member provided with cutting edges arranged concentrally, is known also. However, this type of bit for use in a rock drill also had the shortcoming that it had a reduced destructive ability because the formed ridges of rock is overlain by the groove formed between the cutting edges of the rotary member.

Summary of the invention

It is the object of the present invention to eliminate the aforesaid shortcoming of the conventional rotary bits for use in rotary rock drills.

Another object of the present invention is to provide a rotary bit for use in rotary rock drills, characterized by the arrangement comprising a plurality of spaced cutting edges formed in a plurality of parallel rows on a semi-spherical convex rotary member rotatably mounted on an inclined supporting shaft provided within the body of said rotary drill equipped with scraping members on the lower end portion of the leg of said body for producing a raised core of rock for being cut by said cutting edges, said rows being disposed perpendicular to the same diameter of said convex rotary member and the tip of each cutting edge of one row being substantially parallel to the tips of the adjacent cutting edges of the adjacent rows.

BRIEF DESCRIPTION OF THE DRAWING

FIGS. 1 through 6 show an embodiment of the present invention.

FIG. 1 is a side elevational view, partly in longitudinal section, of the rotary drill equipped with the rotary bit of the present invention;

FIG. 2 is a bottom view of the rotary drill and the rotary bit equipped therein;

FIG. 3 is a side elevational view of the rotary bit of the present invention;

FIG. 4 and FIG. 5 represent a schematic side elevational view and a schematic bottom view, respectively, intended for explaining the principle of the rotary bit of the present invention;

FIG. 6 is a schematic longitudinal sectional view of a part of the cutting edges, intended for explaining the cutting action of the conventional rotary bit for use in a rock drill.

PREFERRED EMBODIMENT OF THE EMBODIMENT

Figure 4:
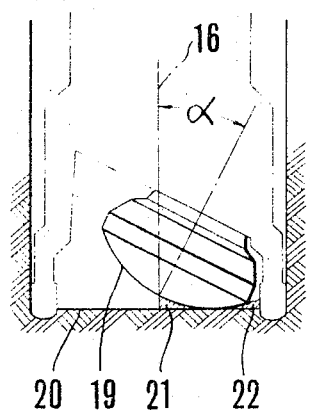
Figure 6:
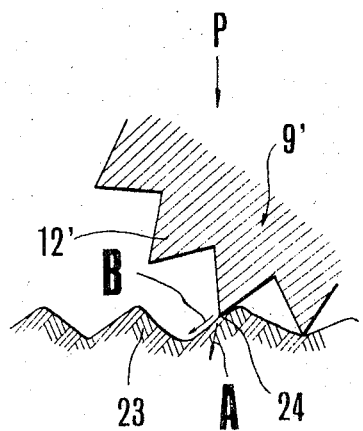

Description will hereunder be directed to an example of the rotary bit of the present invention, by referring to the accompanying drawing.

In FIGS. 1 through 6 of the drawing, reference numeral 1 represents a leg of the body of a drill 2 having a crown configuration. Numeral 3 represents a scraping member provided at the lower end portion of said leg integrally therewith and being made principally with a super hard alloy or a super hard material including diamond. Numeral 4 represents a protective guiding edge member provided on the lowermost end of said leg integrally therewith in the foreground of said scraping member, in case the latter employs diamond, to protect this diamond. Numeral 5 represents a passageway provided in the body 6 of the bit for draining muddy water or spring water. Numeral 7 represents a supporting pipe adapted for mounting said rock drill at the lowermost end. Numeral 8 represents a fixed inclined supporting shaft provided integrally on the body of the bit for supporting a rotary member which carries cutting edges. Numeral 9 represents said rotary member, rotatably mounted, via a ball bearing 10 and a thrust bearing 11, to said inclined supporting shaft 8. Numeral 12 represents cutting edges having a wedge form cross section and provided on said rotary member. Said cutting edges are provided on the convex face of the rotary member in such fashion that they form a plurality of parallel rows each extending perpendicularly to the same diameter of said convex shape rotary member of said bit, and that each row has cutting edges in spaced relationship, and further that the tip of any one of the cutting edges of one row is substantially in parallel with the tips of the adjacent cutting edges of the adjacent rows on both sides.

Description will next be directed to the action of the rock drill equipped with the bit of the present invention by referring to FIGS. 1 and 2.

Figure 5:
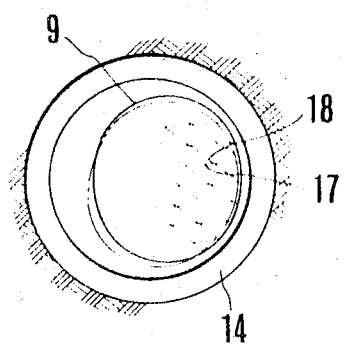

When this rock drill is rotated under an appropriate load P, there is first formed an annular forward recess 14 in the rock by the scraping members 3 and, at the same time, there is formed a raised core 15 of rock inside said annular recess. During this operation, the rotary member 9 and its cutting edges 12 rotate on said raised core of rock about the rotational axis 16 (FIG. 4) of the rock drill, while gradually changing the direction. When the rotary member and the cutting edges have come to their initial positions after one complete revolution, there is formed a ridge 18 of rock by the pressure contact of the cutting edge which is in a direction different from that of the ridge 17 of rock formed initially, as is shown in FIG. 5. Since there is no slipping down of the cutting edge along the sloped ridge of rock as was so in the case of the conventional bits, or since there is no overlying of the ridge of rock and the groove between the cutting edges as has been encountered in the prior art, the cutting edges of the rotary member are prevented greatly from being worn out, and moreover, boring can be done with an intensive and powerful destructive force. The effective destructivity of the raised core of rock is determined, as shown in FIG. 4, by the following factors including the volume ratio between the theoretical shadow portions 21 and 22 which are formed by the circle 19 containing the tips of the cutting edges and the plane 20 contacting said circle and being perpendicular to the rotational axis 16 of the rotary member, the radius of curvature of the circle 19 defined by the tips of the cutting edges, and the angle $\alpha$ of inclination of the rotary member 9. The dimensions of the respective sections and the angle $\alpha$ of inclination of the inclined supporting shaft 8 are established so that the direction of the extension of the tips 13 of the cutting edges is altered at the end of one complete revolution of the rotary member about the rotational axis 16 of the drill.

Also, the aforesaid arrangement of the respective cutting edges provided on a convex face of the rotary member in a manner as shown in the aforesaid embodiment greatly facilitates the manufacture of the cutting edges by cutting with a cutting machine.

The rotary bit of the present invention for use in rock drills is so arranged as has been described. More specifically, a plurality of cutting edges are disposed so as to form a plurality of parallel rows on a convex face of a rotary member so that each row has cutting edges in spaced relationship and that the rows are disposed perpendicularly to the same diameter of said convey rotary member and also that the tip of each cutting edge of one row is substantially parallel to the tips of the adjacent cutting edges of the adjacent rows on both sides. Therefore, in case boring is performed by rotating the drill, the cutting edges of the rotary member of the bit are rotated while gradually altering their direction. When they have come back to their initial positions after making a complete revolution about the rotational axis of the drill, the cutting edges are positioned in a direction which is different from the direction in which the ridges of rock formed prior to this one revolution were disposed. Specifically, there are formed ridges of rocks which are intercepting each other. As a result, it is possible to prevent a loss of energy due to the sliding down of the cutting edges along the sloped faces of the ridges of rock and accordingly to eliminate the overlying of the ridges of rock and the grooves between the cutting edges, which are the shortcomings of the bits of the prior art. Furthermore, the wear of the cutting edges are thus minimized. In addition, the aforesaid simple arrangement of the cutting edges on the convex face of a rotary member facilitates the manufacture of a bit having such an excellent ability as has been described.

What is claimed is:

1. A rotary bit for use in rotary drilling, comprising a rotary member having plurality of spaced cutting edges formed in a plurality of parallel rows on a convex substantially semi-spherical rotary member, rotatably mounted on an inclined supporting shaft provided within the body of said rotary bit equipped with scraping members on the lower end of the leg of said body for producing a raised core of rock for being cut by said cutting edges, said rows being disposed perpendicularly to the same diameter of said convex rotary member, the tip of each cutting edge of one row being substantially parallel to the tips of the adjacent edges of the adjacent rows on both sides.

References Cited

UNITED STATES PATENTS

| | | | |
|---|---|---|---|
| 1,254,267 | 1/1918 | Pickin | 175—334 X |
| 1,762,504 | 6/1930 | Bull | 175—334 X |
| 2,013,839 | 9/1935 | Pickin | 175—376 X |
| 3,055,443 | 9/1962 | Edwards | 175—333 X |
| 3,100,544 | 8/1963 | Overly et al. | 175—333 |

JAMES A. LEPPINK, *Primary Examiner.*

R. E. FAVREAU, *Assistant Examiner.*

U.S. Cl. X.R.

175—376